US012714644B2

(12) United States Patent
Nowak

(10) Patent No.: US 12,714,644 B2
(45) Date of Patent: Aug. 25, 2026

(54) SENSOR DEVICE, SENSOR ARRANGEMENT AND METHOD FOR MEASURING RADIATION

(71) Applicant: VETTER PHARMA-FERTIGUNG GMBH & CO. KG, Ravensburg (DE)

(72) Inventor: Jan Nowak, Ravensburg (DE)

(73) Assignee: VETTER PHARMA-FERTIGUNG GMBH & CO. KG, Ravensburg (DE)

( * ) Notice: Subject to any disclaimer, the term of this patent is extended or adjusted under 35 U.S.C. 154(b) by 175 days.

(21) Appl. No.: 18/689,151

(22) PCT Filed: Aug. 19, 2022

(86) PCT No.: PCT/EP2022/073206
§ 371 (c)(1),
(2) Date: Mar. 5, 2024

(87) PCT Pub. No.: WO2023/036587
PCT Pub. Date: Mar. 16, 2023

(65) Prior Publication Data
US 2024/0374477 A1 Nov. 14, 2024

(30) Foreign Application Priority Data
Sep. 10, 2021 (DE) ..................... 10 2021 123 559.6

(51) Int. Cl.
*A61J 1/03* (2023.01)
*G01J 3/02* (2006.01)
*G01J 3/06* (2006.01)

(52) U.S. Cl.
CPC ............... *A61J 1/03* (2013.01); *G01J 3/0289* (2013.01); *G01J 3/0291* (2013.01); *G01J 3/06* (2013.01);
(Continued)

(58) Field of Classification Search
CPC ...... A61J 1/03; A61J 2200/70; A61J 2200/76; A61J 1/065; G01J 3/0289; G01J 3/0291; G01J 3/06; G01J 2003/062
See application file for complete search history.

(56) References Cited

U.S. PATENT DOCUMENTS 7,499,581 B2 * 3/2009 Tribble .................. B65B 3/003 356/627
10,957,436 B1 3/2021 Aertker et al.
(Continued)

FOREIGN PATENT DOCUMENTS

CN 203564539 U 4/2014

OTHER PUBLICATIONS

International Search Report (English and German) and Written Opinion of the ISA (German) issued in PCT/EP2022/073206, mailed Dec. 5, 2022; ISA/EP.
(Continued)

*Primary Examiner* — Tony Ko
(74) *Attorney, Agent, or Firm* — Harness, Dickey & Pierce, P.L.C.; Stephen T. Olson

(57) ABSTRACT

A sensor device for measuring radiation, in particular infra-red radiation, UV radiation and/or visible light, having at least one sensor element, an energy supply unit for the sensor element, and an at least partially cylindrical container with a middle axis, wherein a container wall of the container is configured to be at least partially transparent, wherein the container is configured at least partially as a medication container. Furthermore, the invention relates to a sensor arrangement and a method for measuring the radiation.

22 Claims, 2 Drawing Sheets

Figure 1:
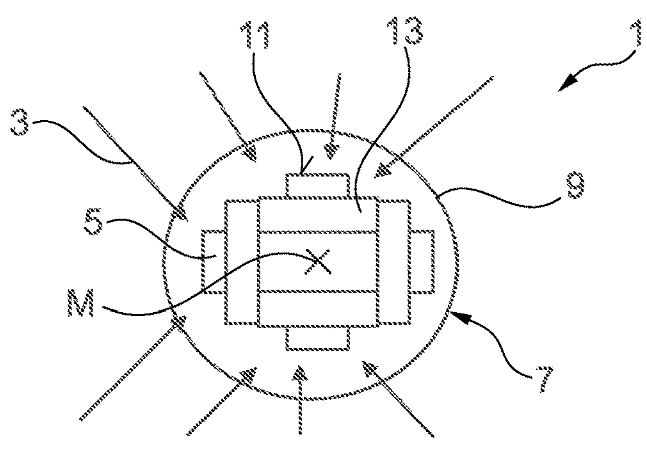

(52) U.S. Cl.
CPC ...... *A61J 2200/70* (2013.01); *G01J 2003/062* (2013.01)

(56) References Cited

U.S. PATENT DOCUMENTS

| | | | | |
|---|---|---|---|---|
| 2012/0268741 | A1 | 10/2012 | Pommereau et al. | |
| 2013/0226134 | A1 | 8/2013 | Schabbach et al. | |
| 2016/0338907 | A1 | 11/2016 | Rice et al. | |
| 2017/0301087 | A1 | 10/2017 | Yuyama et al. | |
| 2021/0299338 | A1* | 9/2021 | Thüring ................ | A61M 1/062 |

OTHER PUBLICATIONS

International Preliminary Report on Patentability of the ISA issued in PCT/EP2022/073206, mailed Mar. 21, 2024, ISA/EP.

* cited by examiner

M
R
23
5
9
25
D
7
27
29

27
M
7
33
7
9
31

35
31
41
43
1
29
31
45
37
47
39

SENSOR DEVICE, SENSOR ARRANGEMENT AND METHOD FOR MEASURING RADIATION

CROSS-REFERENCE TO RELATED APPLICATIONS

This application is a U.S. National Phase Application under 35 U.S.C. 371 of International Application No. PCT/EP2022/073206, filed on Aug. 19, 2022, which claims the benefit of German Patent Application No. 10 2021 123 559.6, filed on Sep. 10, 2021. The entire disclosure of the above patent application is incorporated herein by reference.

FIELD

The invention relates to a sensor device, a sensor arrangement and a method for measuring radiation, in particular electromagnetic radiation, especially in a handling device

BACKGROUND

This section provides background information related to the present disclosure which is not necessarily prior art.

Sensor devices, sensor arrangements and methods of the type mentioned are known. Typically, stationary sensor devices are installed in the handling device, which carry out a radiation measurement during operation of the handling device. However, the radiation measurements that can be carried out are often not accurate enough, as the beam geometry cannot be measured accurately enough with the sensor devices. In particular, the exact radiation geometry within a container to be handled, in particular a medication container, cannot be reproduced in the handling device by means of such sensor devices.

Although a plurality of sensor devices installed in this way can increase the measurement accuracy somewhat, it is still not possible to determine the exact radiation exposure in the container.

Sensor arrangements for checking the light fastness or for measuring the amount of radiation reaching the container are also known, particularly in the medical and pharmaceutical fields. The aim here is to check the light fastness of a medication or active pharmaceutical agent while it is being manufactured, in particular to measure the amount of radiation incident on the medication container during manufacture.

For this purpose, in the known sensor arrangements, the above-mentioned sensor devices are permanently installed at fixed positions of a production line, which measure the radiation to be measured as the medication container passes through the production line. Geometric considerations and calculations are used to deduce the radiation exposure of the medication containers from these measurements of the permanently installed sensor devices.

However, such sensor arrangements require a large number of sensor devices and are not sufficiently accurate despite the large number of sensor devices. Due to the large number of sensor devices required, the measurement is therefore very complex and expensive overall.

The same applies to the method used to determine the amount of radiation.

SUMMARY

This section provides a general summary of the disclosure, and is not a comprehensive disclosure of its full scope or all of its features.

The problem of the present invention is to provide a sensor device, a sensor arrangement and a method for measuring electromagnetic radiation in particular, wherein the aforementioned disadvantages are avoided. In particular, the problem of the invention is to provide a sensor device, a sensor arrangement and a method for measuring electromagnetic radiation in particular, wherein a continuous radiation measurement covering all spatial directions with the highest possible spatial and/or temporal resolution is provided. Furthermore, the problem of the invention is to minimise the design effort, in particular for a sensor arrangement comprising a handling device for a medication container, the design effort and the costs. Furthermore, the problem of the invention is enable the most accurate possible radiation measurement, which in particular comprises a low dependence on an angle relative to a radiation source. In addition, the problem of the invention is to determine as accurately as possible a radiation exposure acting on a medication container, in particular during handling of the medication container.

The problem is solved by providing the present technical teaching, in particular the teaching of the independent claims and the embodiments disclosed in the dependent claims and the description.

The problem is solved in particular by providing a sensor device for measuring in particular electromagnetic radiation, especially infrared radiation, UV radiation and visible light, with at least one sensor element, an energy supply unit for the sensor element and an at least partially cylindrical container with a middle axis, wherein a container wall of the container is configured to be at least partially transparent, and wherein the container is configured at least partially as a medication container. Thereby a device is provided with which an exact and flexibly applicable radiation measurement is possible, wherein in particular a radiation exposure acting on a medication container can be determined easily and accurately. Furthermore, at least one drug container-specific radiation geometry, in particular an optical geometry, can be measured very precisely.

A medication container is understood here in particular to be a container which is configured and/or adapted to hold at least one medical and/or pharmaceutical active ingredient and/or excipient, in particular a medication. Preferably, this is understood to mean a container that is actually intended and usable, in particular authorised, as a medication container. Such an excipient does not necessarily have to comprise a pharmaceutical or medical substance. What is important here is that the excipient is suitable and/or intended for medical and/or pharmaceutical application. In particular, the excipient may also comprise or consist of water for injection purposes, in particular so-called "water for injection".

The medication container is preferably configured as a single-chamber system or as a multi-chamber system, in particular a double-chamber system, wherein—in the case of the multi-chamber system—an interior of the medication container comprises a first chamber and a second chamber, wherein the first chamber is separated from the second chamber in particular by a centre stopper arranged therebetween.

A medication container is understood here in particular to mean a syringe, a cartridge and/or an injection vial, in particular a vial. Accordingly, the container preferably has at least partially the shape of a syringe, a cartridge and/or an injection vial and/or a structural feature thereof.

A transparent configured area is understood here in particular to mean that the area is transparent to the radiation to be measured.

Radiation is understood here in particular to mean radioactive and/or electromagnetic radiation, in particular infrared radiation, UV radiation and light in the visible spectral range.

At least one medication area, in particular the first chamber and/or the second chamber, is preferably configured and adapted in the container and/or medication container to accommodate the medical substance, the pharmaceutical substance and/or the excipient, wherein the at least one sensor element is arranged at least partially, preferably completely, in the medication area of the medication container. Preferably, the medical substance, the pharmaceutical substance and/or the excipient is arranged in the medication area, wherein the sensor element—in particular in the event that the medical substance, the pharmaceutical substance and/or the excipient comprises a liquid—is configured to be sealed, in particular waterproof.

Preferably, the energy supply unit for supplying the sensor element with energy, in particular an electrical voltage and/or current, is operatively connected to the sensor element. Preferably, a mobile energy supply unit, in particular a battery, especially a button cell, is used as the energy supply unit. Alternatively or additionally, the sensor element itself is configured as an energy supply unit, in particular as a solar cell. This provides a self-sufficient energy supply for the sensor element. Furthermore, the resulting energy supply unit is very compact.

Preferably, the sensor device as a whole is transportable and/or configured to be self-sufficient such that no external energy supply, in particular no external electrical current and/or voltage supply is required to operate the sensor device, in particular to measure the electromagnetic radiation in particular.

Preferably, the at least partially cylindrically configured container is cylindrical in a circumferential direction about the middle axis, wherein the container preferably has a base body which is cylindrically configured. Particularly preferably, the cylindrically configured part of the container is at least partially transparent. This provides a structure that resembles or corresponds to a medication container, whereby a radiation exposure for the medication container can be determined particularly accurately.

Preferably, the at least one sensor element—in a radial direction starting from the middle axis—is at least partially oriented outwards, i.e. in a direction away from the middle axis. Preferably, a rear side of the sensor element faces the middle axis and/or a sensor surface of the sensor element faces away from the middle axis. Preferably, the at least one sensor element is orientated exactly radially outwards. In particular, a vectorial component of the surface normal, preferably the entire surface normal, runs exactly radially to the middle axis and points outwards from the middle axis, in particular without passing through the middle axis or pointing in its direction. This means that incoming radiation from the outside can be measured easily and interference from other components, in particular other sensor elements, is avoided during radiation measurement.

An alignment of the sensor elements is understood here in particular to mean an alignment of the surface normal on the sensor surface of the sensor element.

A sensor surface is understood here in particular to mean the sensorically active part of the sensor element. Radiation impinging on the sensor surface can therefore be detected by the sensor element.

Preferably, the sensor device comprises at least one further sensor element which is aligned in the direction of the middle axis, in particular in the direction of a front end and/or in the direction of an opposite, rear end of the container. This also improves radiation measurement in the axial direction, so that the overall measurement accuracy is very high.

Preferably, the container comprises glass and/or plastic. Particularly preferably, the container consists of glass and/or plastic. Hence, the structures formed are even more similar to a medication container, so that the determination of the radiation exposure is further improved.

Further preferably, the container comprises one or more structures selected from a group consisting of an inner wall coating, an outer wall coating, a piston element, a finger rest, in particular for building up pressure when actuating the piston element, a centre stopper, an end stopper, a front opening, in particular for dispensing the medical and/or pharmaceutical substance and/or the excipient, a rear opening and/or a closure element, in particular for closing the front and/or rear opening. The inner wall coating and/or the outer wall coating preferably comprises silicone and/or another material which seals a wall and/or influences the sliding properties, in particular reduces friction. Further preferably, the piston element is connectable, in particular connected, to the end stopper in order to displace the end stopper in the container in the direction of the front opening and thereby discharge a substance, in particular the medical and/or pharmaceutical substance and/or the excipient, which can be arranged in the container, from the container.

Preferably, the container, in particular a cylindrically configured part of the container, has a length which is preferably less than 10 cm, preferably less than 8 cm, preferably less than 7 cm, preferably less than 6 cm, preferably less than 5 cm. A length is understood here in particular to be the distance between the front opening, which is provided for dispensing the contents of the medication container, and a rear opening through which the piston element passes, or—in the case of the injection vial—base section. Preferably, the medication container comprises a transverse dimension, which is measured transversely to the length, in particular perpendicularly thereto, in particular a diameter which is less than 3 cm, preferably less than 2 cm, preferably less than 1.5 cm, preferably less than 1 cm, preferably less than 7 mm, preferably less than 5 mm.

The height is particularly preferably 47.6 mm and the diameter is 4.65 mm. Alternatively, the diameter is 6.35 mm and the height is 43 mm. Alternatively, the diameter is 8.65 mm and the height is 54 mm. Alternatively, the diameter is 11.85 mm and the height is 66.7 mm. Alternatively, the diameter is 14.25 mm and the height is 87.25 mm.

The advantages of the sensor device are particularly pronounced in containers of this size. In particular, the radiation measurement in such small containers is particularly inaccurate using conventional methods, so that the sensor device described here leads to a pronounced improvement in the radiation measurement and the determination of the radiation exposure of the medication container.

Preferably, the sensor element is configured as a photodiode, a photoresistor, a phototransistor and/or a photocell, in particular a solar cell, and is arranged accordingly in the container.

The sensor element is thus arranged in particular in an interior of the container, wherein the interior is particularly preferably configured at least partially as a medication container, preferably as the interior of a medication container.

Preferably, the container as a whole is configured as a medication container. This enables a particularly accurate radiation measurement, in particular with a radiation geometry corresponding to the medication container.

Preferably, the sensor device comprises a data memory and/or an antenna and/or control electronics. The data memory, the antenna and/or the control electronics are preferably arranged in the interior of the container. Thus, the data memory, the antenna and/or the control electronics are protected from external influences, impacts and/or collisions, in particular when passing through a handling device, in particular a production and/or packaging device.

Furthermore, the data memory, the antenna and/or the control electronics are preferably operatively connected to the at least one sensor element in such a way that a measured value measured by the at least one sensor element, in particular a raw measured value, can be transmitted to the data memory, the antenna and/or the control electronics. The transmission can be wireless or wired. This enables simple and automated transmission of the measured values.

Particularly preferably, the sensor device, in particular the container, especially the interior of the container, does not have any processing and/or analysing electronics. The processing and/or analysing electronics are preferably arranged outside the container and/or the sensor device, wherein the processing and/or analysing electronics can be connected to the data memory and/or the antenna of the sensor device for processing the measurement results and/or for analysing the measurement results. This makes the sensor device particularly compact, and in particular makes it possible to utilise the available space in the container, in particular the interior, efficiently, in particular by arranging a large number of sensor elements there. This increases the sensory surface area, which in particular improves the spatial resolution.

Preferably, the sensor device has the medication container, which is configured separately from the container comprising the sensor element. Particularly preferably, the medication container is aligned and arranged adjacent and/or parallel to the container in such a way that at least the part of the container configured as a medication container is aligned in the same way as the correspondingly configured part of the medication container. Thus, the radiation conditions in the medication container on the one hand and the container on the other hand are as similar as possible, so that the radiation exposure of the medication container can be determined very precisely from the radiation measurement by the sensor elements.

According to a further development of the invention, it is provided that the sensor device comprises two sensor elements orientated in opposite directions as at least one sensor element. In this case, the at least one sensor element comprises the two oppositely orientated sensor elements. This enables simultaneous radiation measurement in different spatial directions, in particular in opposite spatial directions.

According to a further development of the invention, it is provided that the sensor device comprises a rotation body and a rotation encoder, in particular a motor, wherein the rotation encoder is adapted to rotate the rotation body and wherein the at least one sensor element is arranged on the rotation body. This makes it possible—in particular also when using only one sensor element—to perform radiation measurement in all radial directions to the middle axis without having to rotate the sensor device. Furthermore, this increases the accuracy of the radiation measurement, even when using several sensor elements.

The rotation encoder, in particular the motor, is therefore rotationally fixed to the rotation body and adapted to set the rotation body in rotation. The rotation encoder is preferably adapted to cause a high rotational speed of the rotation body. This makes it possible to better and more accurately detect an environment, in particular in the radial direction to the middle axis, and in particular—with a moving sensor device—to increase the temporal and/or spatial resolution of the radiation measurement.

Furthermore, the energy supply unit is preferably connected to the motor to supply the motor with energy. This avoids the need for an additional power supply in the container or outside the container and creates a compact sensor device.

Rotation is understood here in particular to mean rotation about the middle axis of the container.

Further preferably, the rotation body and the rotation encoder are arranged in the interior of the container.

According to a further development of the invention, it is provided that the sensor device comprises a collecting optics device. This further increases the measurement accuracy of the radiation measurement. In particular, additional sensor elements can be avoided. As a result, the costs of the sensor device are reduced.

A collecting optics device is understood here in particular to be a device that deflects rays coming from different directions onto the sensor element. In particular, this is understood to mean an optical prism and/or an optical lens.

Preferably, the collecting optics device is arranged in such a way that the beams arriving at the collecting optics device at a collecting angle are deflected to a bundle angle, wherein the bundle angle is smaller than the collecting angle.

According to a further development of the invention, it is provided that a plurality of sensor elements of the at least one sensor element are arranged in the circumferential direction around the middle axis and form a sensor band. This enables radiation measurement in different spatial directions and the overall radiation measurement is very accurate.

Preferably, the multiple sensor elements of the at least one sensor element are arranged at equal distances from each other and/or at equal angles to each other. This increases the metrological coverage of the space, particularly in the radial direction, and the spatial resolution is more homogeneous.

Furthermore, the sensor elements are preferably arranged in such a way that—at least in the direction perpendicular to the middle axis—the entire space around the sensor device is covered by the sensor elements. This makes the radiation measurement particularly accurate and easy to determine. In particular, interpolation to determine the total amount of radiation on the container is avoided.

Preferably, the multiple sensor elements are arranged directly adjacent to each other so that the most comprehensive possible spatial coverage is created.

A sensor band is understood here in particular to be a structure that at least partially encloses, preferably completely encloses, the middle axis. The multiple sensor elements of the sensor band are preferably arranged on a carrier that connects the multiple sensor elements to one another. Alternatively, the multiple sensor elements of the sensor band are arranged independently of one another in the circumferential direction around the middle axis in the container of the sensor device. It is important that the sensor elements of the sensor band can be connected, in particular are connected, to the data memory, the antenna and/or the control electronics.

Preferably, the multiple sensor elements are arranged symmetrically to the middle axis around the middle axis.

This creates uniform sensor coverage of the space and simplifies evaluation of the radiation measurement.

Particularly preferably, the multiple sensor elements are arranged in an annular shape such that the sensor band-especially when viewed in a plane perpendicular to the middle axis—is configured in a circular shape, at least in sections. This ensures particularly good accuracy of the radiation measurement.

The multiple sensor elements of the at least one sensor element are preferably arranged here at a first axial position in the direction of the middle axis, wherein the first axial position is the same for all of the multiple sensor elements. Thus, the sensor band is perpendicular to the middle axis and the sensor coverage of the space is very uniform and symmetrical.

Particularly preferably, at least three, preferably at least four, preferably at least six, preferably at least eight, preferably at least 14, preferably at least 19, preferably at least 27, preferably at least 37, preferably at least 44 sensor elements are configured as one sensor band. This creates an optimum number per sensor band—in particular for conventional medication container sizes and conventional sensor element sizes—and thus a particularly high resolution.

According to an alternative embodiment of the invention, the multiple sensor elements are arranged in the circumferential direction around an axis parallel to the middle axis as a decentralised sensor band. This also provides comprehensive coverage of the space by means of the sensor elements. Furthermore, this arrangement of the sensor elements is compact, so that space remains beyond the middle axis which can be used for other components.

According to a further development of the invention, it is provided that the container comprises at least a first sensor band and a second sensor band, wherein the first sensor band is arranged offset from the second sensor band in the axial direction. This further increases the accuracy of the radiation measurement—in particular for radiation that is incident offset in the axial direction.

According to a further development of the invention, it is provided that at least 2 sensor elements of the at least one sensor element are arranged at an angle of between 110° and 130°, in particular 120°, to each other. This provides very efficient sensor coverage of the space and makes it very easy to analyse the sensor measurement results.

The angle is preferably measured between the surface normals of the sensor surfaces of the sensor element.

Preferably, three sensor elements are arranged in the container, in particular configured as a sensor band, wherein the three sensor elements each have an angle to each other of between 110° and 130°, in particular 120°, whereby in particular the shape of an at least essentially equilateral triangle is formed. Such an arrangement of the sensor elements is particularly efficient and the evaluation of the measurement results is simple, as in this case radiation from a radiation source incident on the sensor device—either—lies in an angular range of a characteristic curve of the sensor element in which the sensor element has a very high detection efficiency, —or—two of the three sensor elements are irradiated simultaneously. If two sensor elements are irradiated in this arrangement, a reduced first measurement efficiency of a first sensor element of the two sensor elements is compensated by a double measurement—with an equally reduced second measurement efficiency—of the second sensor element due to this arrangement, wherein the first measurement efficiency and the second measurement efficiency preferably add up to almost one.

A characteristic curve is understood here in particular to be such a functional relationship between sensor sensitivity and angle of incidence of the radiation, which describes the efficiency with which incoming radiation can be measured by means of the sensor depending on the angle of incidence.

According to an alternative preferred embodiment, the sensor band comprises four sensor elements which are arranged at right angles to each other. This arrangement of the sensor elements is particularly favoured if the sensor elements each have a continuous, linear downward-sloping characteristic curve, as the evaluation of arranged sensor elements is simple, particularly for such characteristic curves. In any case, this improves the measurement accuracy and spatial coverage.

According to a further development of the invention, it is provided that the sensor elements are arranged on a printed circuit board, wherein the printed circuit board is arranged in the container, and wherein an angle of 120°, preferably at most 90°, preferably at most 60° is configured between a first printed circuit board section and a second printed circuit board section. This creates a stable, easy to construct and, in particular, cost-effective conductor structure.

Preferably, the printed circuit boards are configured to be flexible and/or bent in such a way that the sensor elements can be arranged on them at the aforementioned angles, in particular at an angle of at most 120°, preferably at most 90°, preferably at most 60° to one another. It is not absolutely necessary for the printed circuit board sections to be configured to be flat, although according to a preferred further development it is preferable, as this creates clear structures and clear angles.

Alternatively, the printed circuit board sections are configured to be curved, wherein the curvature of the curved printed circuit board sections is so slight that the sensor elements can still be properly mounted on them, in particular they can be soldered on. As a result, the efficiency in different directions is high. In particular, the sensor element can thus measure efficiently in a larger angular range—wherein the angular range of the sensor device relative to a radiation source is addressed here—in particular in the optimum range of the characteristic curve of the sensor element.

These angles are also preferably measured between the surface normals of the printed circuit board sections.

The problem of the invention is in particular also solved by providing a sensor arrangement with a sensor device according to one of the preceding embodiments, wherein the sensor arrangement has a medication container and a handling device, wherein the handling device has a handling fixture configured and set up for handling the medication container, wherein the sensor device, in particular its cylindrically configured section, can be received and handled in the handling fixture. With such a sensor arrangement, the accuracy of a radiation measurement is particularly high. In addition, a radiation exposure of the medication container can be detected very accurately and reliably with such a sensor arrangement.

Preferably, the handling device, in particular the handling fixture, is configured and adapted for handling the medication container. Particularly preferably, the handling fixture comprises a vacuum gripper and/or a mechanical gripper, which is configured to grip the medication container. Preferably, the sensor device, in particular the container, can also be gripped with the vacuum gripper and/or the mechanical gripper.

Further preferably, the medication container and the container of the sensor device are configured at least partially, preferably completely uniformly. Particularly preferably, at least one outer shape of the medication container and/or one outer shape of the container of the sensor device is configured uniformly. Particularly preferably, the two containers differ only in the filling of their interior, wherein the medical substance, the pharmaceutical substance and/or the excipient is preferably arranged in the interior of the container of the sensor device, wherein the sensor element and the energy supply unit for the sensor element are arranged in the interior of the container of the sensor device.

Particularly preferably, the medication container comprises the medical substance, the pharmaceutical substance, and/or the excipient in an interior, in particular the medication area, of the medication container.

Preferably, the sensor arrangement comprises a data processing device with a receiver device, wherein the sensor device comprises a transmitter device. Preferably, the transmitter device and the receiver device are configured and adapted in such a way that a measurement result of the sensor device can be transmitted between the transmitter device and the receiver device. Preferably, the connection between the receiver device and the transmitter device is configured to be wireless.

Preferably, the medication container is arranged in the handling fixture, which is now referred to here as the first handling fixture for the sake of better understanding, and the sensor device is arranged in a further handling fixture, wherein the handling device is preferably adapted such that—in an operation of the handling device—the further handling fixture follows or leads the first handling fixture in which the medication container is arranged. Thus, a path travelled by the two handling fixtures in the handling device is very similar, preferably the same. As a result, the sensor device can be used to measure with particular accuracy the radiation load acting on the medication container.

In particular, the task is also solved by creating a method for measuring electromagnetic radiation in a container with a sensor device according to one of the preceding embodiments or a sensor arrangement according to one of the preceding embodiments, wherein the sensor element of the sensor device performs a radiation measurement in the container. As a result, a radiation measurement, in particular an amount of radiation and thus a radiation exposure acting on the medication container, can be determined very accurately, since it essentially corresponds to the amount of radiation measured by the sensor device. The radiation measurement is therefore very accurate overall.

Preferably, the radiation measurement is used to draw conclusions about the radiation exposure of the medication container. In particular, it is assumed that a radiation exposure determined by means of the sensor device, in particular the radiation measurement, corresponds to the radiation exposure of the medication container. Alternatively, a correction factor is used, in particular a constant correction factor, which corrects the radiation measurement in order to determine the radiation exposure of the medication container. As a result, the radiation exposure of the medication container can be determined very efficiently and accurately, since the radiation is determined very accurately for the medication container by means of the sensor device, in particular the part of the sensor device configured as a medication container.

According to a further development of the invention, it is provided that—in a first handling step—a medication container is handled in an automated handling device, wherein—in a second handling step—the sensor device is handled in the automated handling device, wherein the first handling step and the second handling step are carried out in the same way, and wherein the radiation measurement is carried out with the sensor device during the second handling step. As a result, the radiation measurement can be carried out very accurately in the automated handling device. In particular, the radiation exposure of the medication container can thus be determined very accurately and continuously—in particular during handling.

An automated handling device is understood here in particular to mean a filling system and/or a packaging system.

By a handling step is understood here in particular an automated relocation, a filling, a label application, a sealing, a siliconisation, an application of a closure element, an insertion of a plunger, a geometric measurement of the container of the sensor device or of the medication container, a fill level measurement, a packaging in secondary packaging and/or a manual relocation, in particular for inspection and/or maintenance purposes.

A similar execution of the handling steps is understood here in particular to mean that the handling steps for the sensor device and the medication container are similar in such a way that the same action is performed by the handling device and/or by a manual operator. The second handling step for the sensor device and the first handling step for the medication container take place at the same time or with a time delay.

Preferably, the radiation measurement is carried out during the entire handling of the sensor device in the particularly automated handling device—in particular at several points in time and/or time range, particularly continuously. As a result, the radiation measurement is very accurate and the radiation exposure of the medication container can be determined precisely.

Particularly preferably, the at least one further handling step is carried out with the medication container, wherein the medication container is particularly preferably filled or is already filled, and/or is packaged in secondary packaging.

According to a further development of the invention, it is provided that—in particular in the course of a logistics process and/or delivery process—at least one medication container is moved from a first position to a second position, wherein the sensor device is moved together with the medication container. As a result, the radiation exposure of the medication container can be determined very accurately, in particular before or after such a relocation.

Preferably, the displacement of the sensor device and medication container takes place simultaneously, so that the determination of the radiation exposure of the medication container is particularly realistic and thus accurate.

According to a further development of the invention, it is provided that the radiation measurement of the sensor device is carried out during the displacement from the first position to the second position. As a result, the radiation measurement can also be carried out very accurately during the displacement. In addition, the radiation exposure of the medication container can be determined very accurately during the displacement.

The radiation measurement is carried out at least at one point in time during the displacement. Preferably, the radiation measurement is carried out over a period of time, in particular the entire period of the relocation. As a result, the radiation exposure of the medication container can be determined very accurately over the entire time.

According to a further development of the invention, it is provided that a measurement result of the radiation measurement is sent from a transmitter device to a receiver device of a data processing device and is processed by the data processing device. This provides for simple, in particular automated processing, in particular evaluation of the measurement result, wherein in particular small containers and/or medication containers can also be measured in terms of radiation in this way. To transmit the measurement result, a wireless or wired connection is preferably established between the transmitter device and the receiver device.

Preferably, the measurement result comprises at least two partial measurements from two partial sensors, which increases the measurement accuracy.

According to a further development of the invention, it is provided that the two sensor elements are arranged at an angle of 120° to one another, wherein a first radiation intensity of a radiation source is measured with the first sensor element, wherein—in particular simultaneously and with the same orientation of the sensor device to the radiation source-a second radiation intensity of the radiation source is measured with the second sensor element, wherein the first radiation intensity and the second radiation intensity are calculated unweighted to form a total radiation intensity, in particular added together. This creates a simple and at the same time very accurate calculation method for determining the radiation exposure for the container of the sensor device and thus also for the medication container.

A radiation intensity is understood here in particular to mean a radiation quantity and/or a radiation intensity, in particular illuminance.

In this context, complete offsetting means in particular that no angle-dependent weighting takes place. In particular, the radiation measurement results recorded by the sensor elements are therefore taken into account equally.

According to a further development of the invention, it is provided that the method is at least partially carried out as a computer-implemented method. Based on the measurement of the sensor device via said method, a correlation can be made to a computerised calculation of these values, which further improves this calculation and thus opens up an automated application thereof.

Preferably, the radiation measurement of the radiation by the sensor device is at least partially, preferably completely computerised.

Preferably, the sensor device and/or at least one of the radiation sources has a localisation device, in particular a GPS device, with the aid of which a position of the sensor device and/or the radiation source is determined, in particular as a function of time. Preferably, a distance and/or an angle of incidence from the radiation source to the sensor device is determined.

Alternatively, the position of the radiation source is specified manually in particular.

The computer-implemented method is based on the following teaching, wherein at least one calculation step, preferably all calculation steps of this teaching are carried out using a computer.

If one considers the influencing factors that determine the radiation intensity, in particular an illuminance, which are not specific to the radiation source, the distance and the angle of incidence remain as relevant variables.

The geometric position, in particular the geometric points, of the radiation source, in particular a lamp, in the room are known, wherein the centre of the lamp surface is assumed to be the position.

This makes it possible to determine the position vector (OLx) of each radiation source, in particular light source, in geometric space. To determine the distance of the radiation source to any measurement point (with location vector OPx), the connection vector (VLxPx) of the two points in space is used. This is calculated according to $$\overrightarrow{VL1P1} = \overrightarrow{OP1} - \overrightarrow{OL1} = \begin{pmatrix} x_{OP1} \\ y_{OP1} \\ z_{OP1} \end{pmatrix} - \begin{pmatrix} x_{OL1} \\ y_{OL1} \\ z_{OL1} \end{pmatrix}$$

The connection vector is used to calculate the distance between the radiation source, in particular the light source, and the measuring point according to $$r = |\overrightarrow{VL1P1}| = \sqrt{x_{VL1P1}^2 + y_{VL1P1}^2 + z_{VL1P1}^2}$$

With regard to the influence of the angle, only the output angle of the radiation, in particular the light beam, from the radiation source is considered, as the angle of incidence is always assumed to be a worst-case scenario in which the middle axis of the medication container or the container is at right angles to the incident radiation. For the calculation, the connection vector (VLxPx) and the location vector of the radiation source (OLx), in particular the light source, are used to create a straight line that intersects with a ceiling plane. This intersection can be calculated according to $$\alpha = \sin^{-1}\left(\frac{\left|\vec{n}_E \circ \vec{u}\right|}{\left|\vec{n}_E * \vec{u}\right|}\right)$$

can be calculated. Here, $\vec{n}_E$ represents the normal vector of a radiation source plane that is defined by the radiation source, in particular the lamp. Thus, $$a \, \vec{n}_E \text{ with } \vec{n}_E = \begin{pmatrix} 0 \\ 0 \\ 1 \end{pmatrix}$$

can generally be defined for radiation sources on a ceiling, in particular ceiling lamps. $\vec{u}$ is the u direction vector of the intersecting lines and thus the connection vector (VLxPx).

The distance and angle calculated in this way can be used to calculate the radiation intensity, in particular illuminance, for each measurement point for each radiation source, in particular light source. The total value of the radiation intensity can be calculated according to $$E_{v\ ges} = E_{v\ L1} + E_{v\ L2} + \ldots + E_{v\ Lx}$$

from the individual radiation intensities.

The computer, in particular a spreadsheet program running on the computer, can calculate this for each measuring point in the room with any number of radiation sources. This basic principle is also the basis for "path tracking", which is described below, wherein the basic principle is merely extended by the factor of "automated measurement point creation in geometric space".

If the radiation intensity is known, the proportion of each radiation source in the total radiation intensity in the measuring point can be theoretically recalculated using this method.

The "path tracking" is explained in more detail below. Programmable path tracking is based on significant points of a path travelled by the medication container and/or the sensor device in space (e.g. changes in direction, as in the transition from one conveyor belt to another). A connection vector is calculated between these points (to be entered manually), which reflects the path travelled by the medication container and/or the sensor device. A time t>0 is required for the initial spatial points, which reflects the elapsed time from the start of the medication container and/or the sensor device until this point is reached. Based on this difference and the entered measurement frequency (every second, etc.), the connection vector is divided into individual vectors. To determine the geometric coordinates of each individual intermediate measuring point on the connection vector, the location vector of the front spatial point is added to x times the divided connection vector. The radiation intensity, in particular illuminance, can now be calculated at the points calculated in this way in accordance with the above teaching. The same is also possible in the other direction for assigning the proportion of individual radiation sources to the measured radiation intensity.

Overall, the at least partially computerised implementation of the method further improves the accuracy of the radiation measurement. In addition, at least partially automated radiation measurement is possible as a result.

The descriptions of the method, the sensor device and the sensor arrangement are to be understood as complementary to each other. In particular, features of the sensor device and/or the sensor arrangement that have been explicitly or implicitly described in connection with the method are preferably features of the sensor device and/or the sensor arrangement, cither individually or in combination with one another. Preferably, the sensor device and/or the sensor arrangement are configured to perform at least one of the method steps described in connection with the method. Method steps described explicitly or implicitly in connection with the sensor device and/or the sensor arrangement are preferably steps of a preferred embodiment of the method, either individually or in combination with one another. In particular, the method preferably includes at least one step resulting from at least one feature of the sensor device and/or the sensor arrangement.

Further areas of applicability will become apparent from the description provided herein. The description and specific examples in this summary are intended for purposes of illustration only and are not intended to limit the scope of the present disclosure.

DRAWINGS

The drawings described herein is for illustrative purposes only of selected embodiments and not all possible implementations, and are not intended to limit the scope of the present disclosure.

Figure 2:
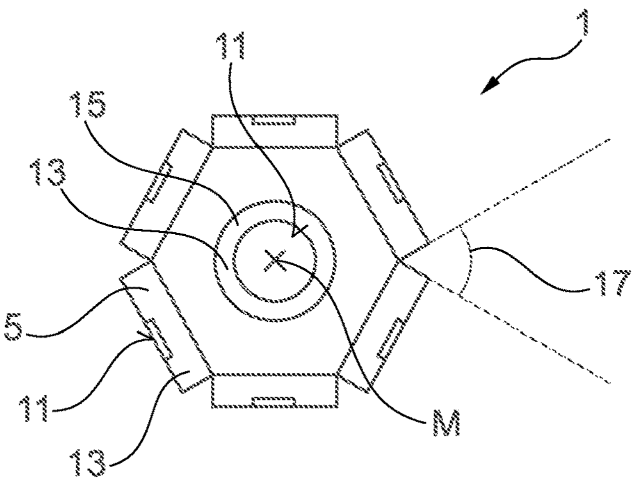
Figure 3:
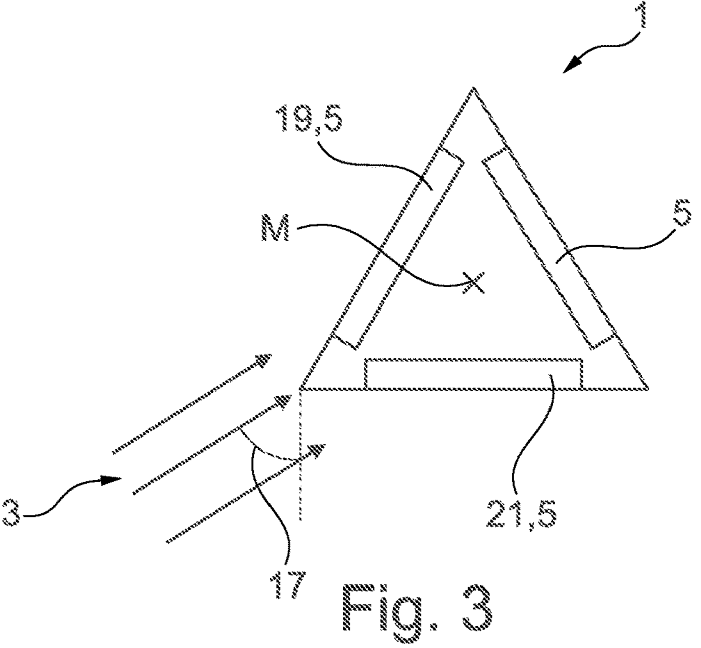
Figures 4, 5, 6:
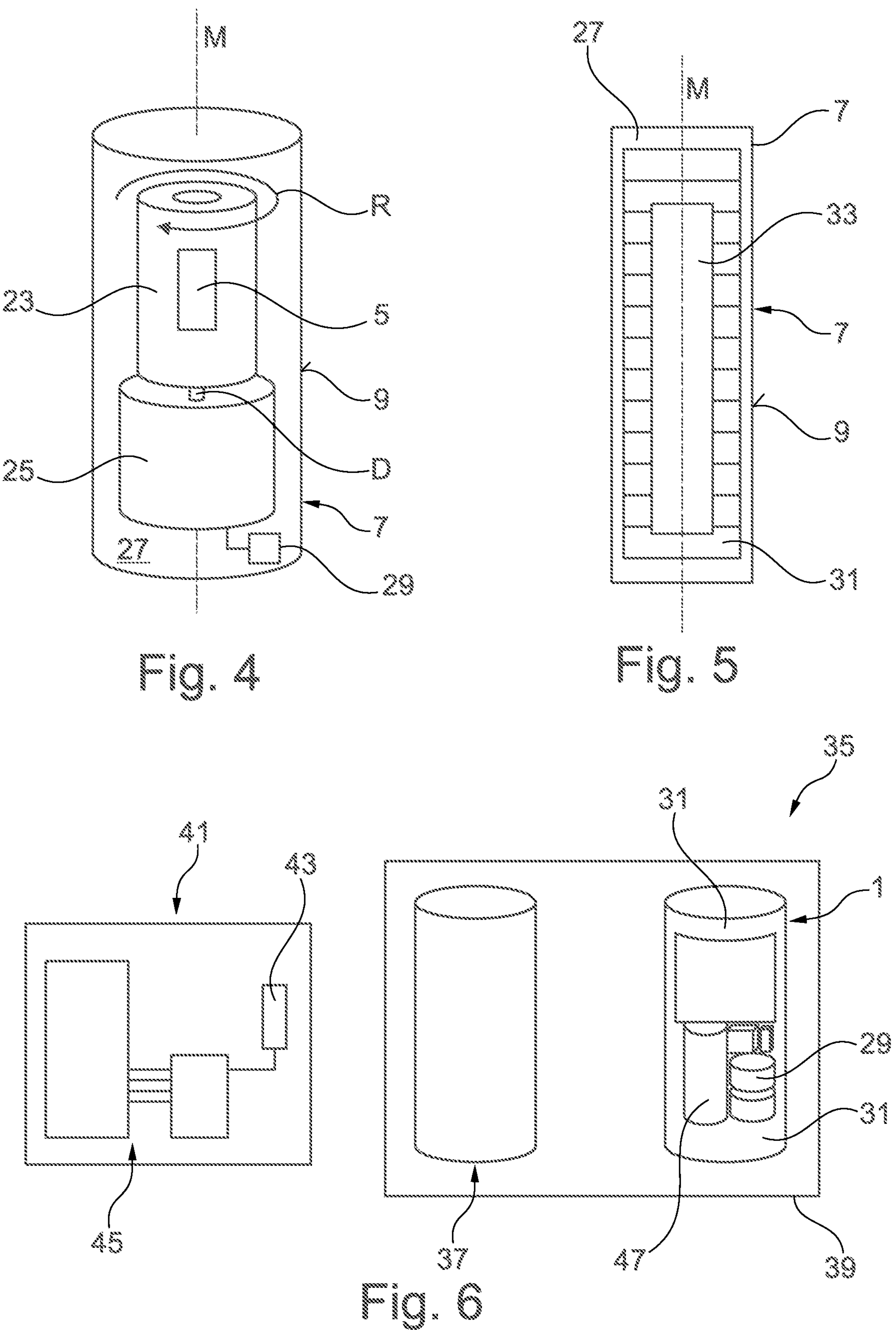

The invention is explained in more detail below with reference to the drawings. These show:

FIG. 1 a cross-section through a container of a sensor device with four sensor elements in a schematic representation according to a first embodiment, FIG. 2 a top view of a sensor device according to a second embodiment, FIG. 3 a schematic representation of a sensor device according to a third embodiment, FIG. 4 a schematic representation of a sensor device according to a fourth embodiment in a perspective side view, FIG. 5 a side view of a sensor device according to a fifth embodiment, and FIG. 6 a sensor arrangement with a sensor device according to a sixth embodiment as well as a medication container and a handling device.

DETAILED DESCRIPTION

Example embodiments will now be described more fully with reference to the accompanying drawings.

FIG. 1 shows a sensor device 1 for measuring radiation 3, which impinges on at least one sensor element 5, here in particular four sensor elements 5. The sensor device 1 comprises an at least partially cylindrically configured container 7 with a middle axis M, wherein a container wall 9 of the container 7 is at least partially transparent. Furthermore, the container 7 is configured at least partially as a medication container. In addition, the sensor device 1 has an energy supply unit for the sensor element 5, which is not shown in FIG. 1. This creates an efficient sensor device 1 that enables very accurate radiation measurement in the container 7, which is at least partially configured as a medication container, so that in particular very accurate conclusions can be drawn about radiation exposure in a correspondingly configured medication container.

In particular, the container wall 9 is preferably configured as a medication container in a region in which the container wall 9 is transparent. The container thus also comprises at least one transparently configured area. The cylindrically configured part of the container 7, in particular the container wall 9, is particularly preferably transparent. As a result, the radiation exposure on the medication container can be determined very accurately, particularly in a correspondingly transparent configured area.

The sensor device 1 according to the first embodiment shown in FIG. 1 has, in particular, four sensor elements 5, which are arranged at a right angle to each other, so that a rectangle is configured from the sensor elements 5. This ensures that the radiation 3 can be reliably measured at least in all directions perpendicular to the middle axis. This right-angled arrangement is particularly advantageous for sensor elements 5 comprising a characteristic curve that is uniformly linear over the entire angular range from 0° to 90°. This makes the radiation measurement particularly accurate and, in particular, independent of an angle of incidence of radiation, at least in the cross-sectional plane shown here, with a constant orientation of the sensor device 1 in space. In particular, this also simplifies evaluation of the radiation measurement.

The sensor element 5 comprises in particular a sensor surface 11 and a sensor body 13.

FIG. 2 shows a sensor device 1 according to a second embodiment. The sensor surfaces 11 of the sensor elements 5 shown here are embedded in the sensor body 13 in such a way that the sensor surface 11 is flush with the sensor body 13.

The sensor device 1 shown in FIG. 2 according to the second embodiment comprises six sensor elements 5, in particular in the circumferential direction around the middle axis M, wherein for the sake of clarity in FIG. 2, as in FIG. 1, only one of the sensor elements 5 aligned in the radial direction is each provided with a reference sign. Due to the six sensor elements 5, the sensor coverage of the space is improved.

In addition, a further sensor element 15 can be seen in FIG. 2, the sensor surface 11 of which is arranged in particular perpendicular to the middle axis M and thus faces the viewer in FIG. 2. In addition, the further sensor element 15 is arranged here in particular centrally on the middle axis M. This also improves radiation measurement in the direction of the middle axis M. In particular, it is also possible to reliably measure radiation that is incident on the sensor device 1 parallel to the middle axis M.

FIG. 2 also shows that an angle 17 between two sensor elements 5 arranged adjacent to each other is measured between the surface normals of the sensor elements 5, in particular the sensor surfaces 11.

The angle 17 shown here in FIG. 2 is preferably 60°, especially with six sensor elements.

FIG. 3 shows the sensor device 1 according to a third embodiment in a highly simplified schematic representation with sensor elements 5 in the circumferential direction around a middle axis 3. The sensor elements 5 are arranged at a particularly advantageous angle 17 of 120° to each other. In particular, this also means here that the corner angles of the triangle shown here, which is configured in particular as an equilateral triangle, have an angle of 60°.

The angle 17 of 120° shown in FIG. 3 means in particular that the radiation measurement for conventional sensor element types is particularly accurate, in particular independent of an angle of incidence of the radiation—in the cross-sectional plane shown here—relative to the sensor elements 5. At an angle of incidence of 60°, such conventional sensor element types measure only about half of the actual radiation intensity, which corresponds to an efficiency factor of 0.5. In the arrangement of the three sensor elements 5 shown here, this reduced measurement efficiency is compensated for by the fact that radiation incident at an oblique angle, in particular at an angle of 60°, is additionally measured by one of the two neighbouring sensor elements 5. A beam of radiation coming from one direction and hitting the entire sensor device 1 therefore also hits a second sensor element 21 of the sensor elements 5 at an angle of 60°, in particular—at an angle of incidence of 60° with respect to a first sensor element 19 of the multiple sensor elements 5. By adding the two measured radiation intensities, which are reduced by 50% at an angle of incidence of 60°, the total radiation intensity can be determined very easily, as the total efficiency resulting from the sum of the individual efficiency factors is almost one, preferably exactly one, due to the double measurement.

Moreover, since a characteristic curve for the usual types of sensor element is at least approximately linear, particularly in the range of the angle of incidence of 60°, this simple calculability of the total radiation intensity shown above is also maintained for angles of incidence of radiation deviating from 60° that hit at least two of the sensor elements 5, in particular the first sensor element 19 and the second sensor element 21. Without the need for complex mathematical correction, the reduced efficiency factor of one sensor element 5 of the first and/or second sensor element due to the angle is compensated for by a correspondingly increased efficiency factor of the other sensor element 5 in such a way that the overall efficiency is close to one. This enables angle-independent measurement regardless of the angle of incidence in the plane perpendicular to the middle axis M shown here.

FIG. 4 shows the sensor device 1 according to a fourth embodiment, wherein the sensor device 1 is schematically shown here in a perspective side view. In particular, the sensor device 1 comprises a rotation body 23 and a rotation encoder 25, in particular a motor.

The rotation encoder 25 is adapted to rotate the rotation body 23. Furthermore, the sensor element 5 is arranged on the rotation body 23. The rotation takes place in particular in a direction of rotation R about an axis of rotation D.

As can be seen in FIG. 4, the rotation body 23, rotation encoder 25 and sensor element 5 are arranged here in an interior 27 of the container 7. Furthermore, the sensor device 1 shown here additionally comprises an energy supply unit 29, which is adapted to supply the sensor element 5 and/or the rotation encoder 25 with energy. As a result, no external energy supply is required to operate the sensor device and a larger number of sensor elements 5 can be arranged in the interior of the container, which increases the accuracy of the radiation measurement.

FIG. 5 shows a side view of the sensor device 1 according to a fifth embodiment. In each case, several sensor elements 5 are configured as a sensor band 31. The multiple sensor elements 5 are arranged in the circumferential direction around the middle axis M. This ensures high measurement accuracy and, in particular, high sensor coverage of the solid angle.

Due to the schematic representation chosen in FIG. 5, the sensor elements 5 are not explicitly shown here. However, as is clearly recognisable from the figure, several, in particular thirteen, sensor bands 31 are arranged in the interior 27 of the container 7. Due to the arrangement of the sensor bands 31 distributed in the axial direction, radiation 3 arriving in a correspondingly distributed manner in the axial direction can also be measured reliably and accurately.

Furthermore, it is shown in FIG. 5 that further components 33, in particular electronic components, which may be necessary are arranged in the interior 27 of the container 7. Particularly preferably, the sensor bands 31 surround the middle axis and the components 33. The representation selected in FIG. 5 thus preferably corresponds to a sectional representation through the middle axis, wherein the sensor bands 31 surround the component 33 in particular in the direction out of the image plane and thus optically obscure it.

FIG. 6 shows a sensor arrangement 35 with a sensor device 1, a medication container 37 and a handling device 39, wherein the handling device 39 comprises a handling fixture configured and set up for handling the medication container 37, which is not explicitly shown here. Furthermore, the sensor device 1 can be picked up and handled in the handling fixture. This enables very accurate radiation measurement by means of the sensor device 1. In addition, the radiation exposure of the medication container 37 can be determined very accurately.

The sensor arrangement 35 further comprises a data processing device 41, which is adapted in particular to receive measurement results of the sensor elements 5 by means of a receiver device 43, in particular an antenna, and to process them with a data processing module 45, in particular to determine a total radiation, in particular total radiation intensity and/or total radiation quantity, and thus a radiation exposure for the sensor device 1 and/or the medication container 37. In particular, by configuring the data processing device outside the sensor device 1, a very compact sensor device 1 is created.

For communication between the sensor device 1 and the data processing device 41, the sensor device 1 in the sixth embodiment of the sensor device 1 shown here comprises a transmitter device 47, in particular an antenna, which is configured and adapted to establish a wireless connection with the receiver device 43 of the data processing device 41 and to send and/or receive data via it. As a result, no data processing device is necessary in the container 7 of the sensor device 1, so that the interior 27 can be increasingly equipped with sensor elements 5.

The foregoing description of the embodiment has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A sensor device for measuring radiation, the sensor device having at least one sensor element, an energy supply unit for the sensor element, and an at least partially cylindrical container with a middle axis, wherein the container is configured at least partially as a medication container, wherein the sensor device comprises a rotation body and a rotation encoder, wherein the rotation encoder is adapted to rotate the rotation body, and wherein the at least one sensor element is arranged on the rotation body.

2. The sensor device according to claim 1, wherein the sensor device comprises two oppositely aligned sensor elements as at least one sensor element.

3. The sensor device according to claim 1, wherein the sensor device comprises a collecting optics device.

4. The sensor device according to claim 1, wherein a plurality of sensor elements of the at least one sensor element are arranged in a circumferential direction around the middle axis and form a sensor band.

5. The sensor device according to claim 1, wherein the container comprises at least a first sensor band and a second sensor band, wherein the first sensor band is arranged offset from the second sensor band in an axial direction.

6. The sensor device for measuring radiation according to claim 1, wherein a container wall of the container is configured to be at least partially transparent.

7. A sensor device for measuring radiation, having at least one sensor element, an energy supply unit for the sensor element, and an at least partially cylindrical container with a middle axis, wherein the container is configured at least partially as a medication container, wherein at least two sensor elements of the at least one sensor element are arranged at an angle of between 110° and 130°.

8. The sensor device for measuring radiation according to claim 7, wherein a container wall of the container is configured to be at least partially transparent.

9. A sensor device for measuring radiation, having at least one sensor element, an energy supply unit for the sensor element, and an at least partially cylindrical container with a middle axis, wherein the container is configured at least partially as a medication container, wherein a plurality of sensor elements of the at least one sensor element are arranged in a circumferential direction around the middle axis and form a sensor band, and wherein the plurality of sensor elements are arranged on a printed circuit board, wherein the printed circuit board is arranged in the container and has an angle of at most 120° between a first printed circuit board section and a second printed circuit board section.

10. The sensor device for measuring radiation according to claim 9, wherein a container wall of the container is configured to be at least partially transparent.

11. A sensor arrangement comprising:

a sensor device for measuring radiation having at least one sensor element, an energy supply unit for the sensor element, and an at least partially cylindrical container with a middle axis, wherein the container is configured at least partially as a medication container;

a medication container; and a handling device, the handling device having a handling fixture configured and set up for handling the medication container, wherein the sensor device is adapted to be received and handled in the handling fixture.

12. The sensor arrangement for measuring radiation according to claim 11, wherein a container wall of the container is configured to be at least partially transparent.

13. A method for measuring radiation in a container, with a sensor device having at least one sensor element, an energy supply unit for the sensor element, and an at least partially cylindrical container with a middle axis, wherein the container is configured at least partially as a medication container, wherein the method for measuring radiation includes carrying out a radiation measurement in the container with the sensor element of the sensor device.

14. The method according to claim 13, wherein;

in a first handling step, a medication container is handled in an automated handling device, wherein in a second handling step, the sensor device is handled in the automated handling device, and wherein during the second handling step the radiation measurement is carried out with the sensor device.

15. The method of claim 14, wherein the first handling step and the second handling step are carried out in a same way.

16. The method according to claim 13, wherein at least one medication container is displaced from a first position to a second position, wherein the sensor device is displaced together with the medication container.

17. The method according to claim 16, wherein the radiation measurement of the sensor device is carried out during displacement of the medication container from the first position to the second position.

18. The method according to claim 13, wherein a measurement result of the radiation measurement is sent from a transmitter device to a receiver device of a data processing device and is processed by the data processing device.

19. The method according to claim 13, wherein the at least one sensor element includes two sensor elements are arranged at an angle of 120° to one another, wherein a first radiation intensity of a radiation source is measured with a first sensor element, wherein a second radiation intensity of the radiation source is measured with a second sensor element, wherein the first radiation intensity and the second radiation intensity are offset unweighted to form a total radiation intensity.

20. The method to claim 13, wherein a container wall of the container is configured to be at least partially transparent.

21. A method for measuring radiation in a container with a sensor arrangement including:

a sensor device for measuring radiation having at least one sensor element, an energy supply unit for the sensor element, and an at least partially cylindrical container with a middle axis, wherein the container is configured at least partially as a medication container;

a medication container; and a handling device, the handling device having a handling fixture configured and set up for handling the medication container, wherein the sensor device is adapted to be received and handled in the handling fixture, and wherein the method for measuring radiation includes carrying out a radiation measurement in the container with the sensor element of the sensor device.

22. The method to claim 21, wherein a container wall of the container is configured to be at least partially transparent.

* * * * *